V. Houck,
Wood Planing Machine.
N° 15,129.   Patented June 17, 1856.
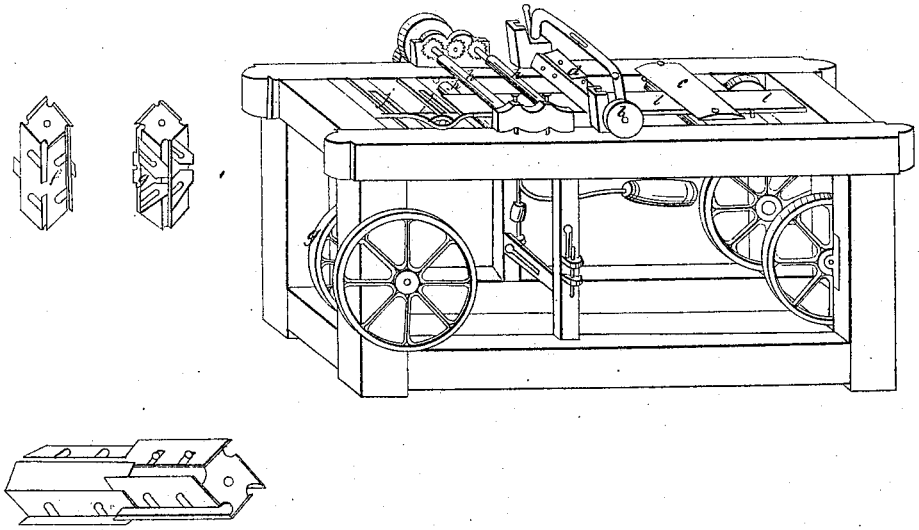
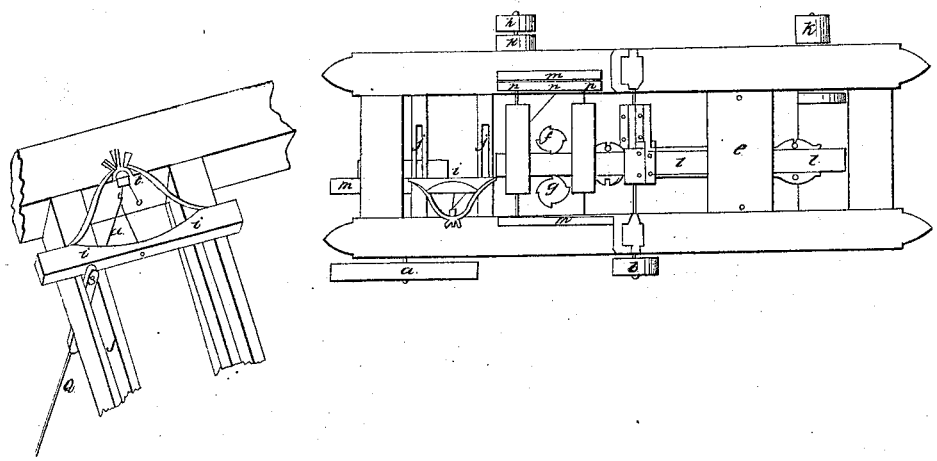
Witnesses:
E. C. Sprague
Henry S. Gansevoort
Inventor:
Valentine Houck

UNITED STATES PATENT OFFICE.

VALENTINE HOUCK, OF BUFFALO, NEW YORK.

CURTAIN DEVICE IN PLANING-MACHINES.

Specification of Letters Patent No. 15,129, dated June 17, 1856.

*To all whom it may concern:*

Be it known that I, VALENTINE HOUCK, of the city of Buffalo, county of Erie, and State of New York, have invented certain Improvements in Planing, Molding, and Matching Machines; and I do hereby declare that the following is a full and exact description thereof, reference being had to the accompanying drawings and to the letters of reference marked thereon.

The nature of my invention consists first in providing said machines with a movable rest, so arranged that the board sought to be planed, matched or molded will pass through the machine in a fixed direction and yet so that its sides will not be compressed out of their natural position. As such machines are now constructed if the board is laterally crooked, the fixed rests now used press the board so that it is straight while passing through the machine; the knives on the sides have no opportunity to cut off the outward curves and as soon as free from the confinement of the machine its elasticity restores it to its original irregular form. This is prevented in my invention so that a board in passing through a machine once, may be planed upon its surfaces and also its sides made perfectly straight.

The improvement is particularly valuable in matching and molding machines as it enables the operation to be performed by passing the board through the machine once instead of several times as is now necessary.

To enable others skilled in the art to make and use my invention, I will proceed to describe its construction and operation.

I construct a solid wooden rest (*i*) supported by curved metal springs behind, sufficiently strong to maintain the rest in its place so as to support the board when it enters the machine and yet which will yield when drawn by the wires (*u, u*) as hereinafter described.

In the cross piece in front of the first feeding roller I make the slot (*j*) through which passes the piece (*s,*) with a friction wheel (*t*) sustained by a metal spring (*Q*). This piece and spring will not yield to the weight of the board until it is pressed by the feeding rollers.

The rest keeps the board in a proper position until it reaches the feeding rollers. Their pressure will keep it in a proper position until it reaches the fixed rests beyond the feed rollers. As soon as the board comes under the first feed roller it presses the board and forces the piece (*s*) down upon the spring (*Q*) which acts upon the wires (*u, u*) which pass through a friction roller and draw back the rest (*i*). The board is thus free from any lateral compression, resumes its natural shape and its convexities are cut off by the knives (*f* and *g*). When used in matching and molding machines in connection with the knives hereinafter described, the convexities are cut off and the molding or matching completely performed in one operation.

What I claim as my invention is—

1. The movable rest and the springs attached and the piece (*s*) in the slot (*j*) which combined with the wires (*u, u*) produce the effect which I have described.

My invention further consists in an improved arrangement of the matching and molding knives. At the present the knives which plane off the edge of the board and those which make the grooves or moldings are placed upon the same line. The consequence is that a feather is left in the board in the slight space which will always exist between the knives nor can alterations be made in the grooving knives without taking all the knives out and introducing new ones. To obviate these difficulties I fasten to the cylinder (9) planing knives its whole width. They strike the edge of the board and plane it smooth. I then fasten the grooving or molding knife or knives into the cylinder behind the planing knife and so that they strike the edge of the board before it is planed by the planing knife, being the longest. The result is that no feather is left. The work is all smooth after being torn by the grooving knives and as many and as different shaped molding and grooving knives can be introduced either on a line or one between the other as may be desired without involving the necessity of changing the planing knife or other grooving knives. In this way as many and as different formed moldings and grooves may be made as is desired by passing the board once through the machine.

2. This arrangement of knives by placing the grooving and molding knives behind the planing knives instead of on a line with them is what I claim as my invention.

And I ask for a patent for these improvements so that I may either construct a machine combining them or sell the improvements to others to be used upon machines already constructed.

VALENTINE HOUCK.

Witnesses:
E. C. SPRAGUE,
HENRY S. GANSEVOORT.